United States Patent
Kikuchi (10) Patent No.: US 7,916,206 B2
(45) Date of Patent: Mar. 29, 2011

(54) FOCUS DETECTION APPARATUS AND FOCUSING CONTROL APPARATUS UTILIZING PHOTOELECTRIC CONVERTING ELEMENT OUTPUT

(75) Inventor: Takayuki Kikuchi, Tochigi (JP)

(73) Assignee: Canon Kabushiki Kaisha (JP)

( * ) Notice: Subject to any disclaimer, the term of this patent is extended or adjusted under 35 U.S.C. 154(b) by 997 days.

(21) Appl. No.: 10/818,985

(22) Filed: Apr. 5, 2004

(65) Prior Publication Data

US 2004/0196401 A1 Oct. 7, 2004

(30) Foreign Application Priority Data

Apr. 7, 2003 (JP) ................... 2003-102460

(51) Int. Cl.
*H04N 13/00* (2006.01)
*H04N 5/232* (2006.01)

(52) U.S. Cl. ........................ 348/349; 348/345

(58) Field of Classification Search .................. 348/345, 348/349, 351, 353–356

See application file for complete search history.

(56) References Cited

U.S. PATENT DOCUMENTS

| 5,061,954 | A | * | 10/1991 | Toyama et al. | 396/103 |
| 5,486,860 | A | * | 1/1996 | Shiokawa et al. | 348/354 |
| 5,539,462 | A | * | 7/1996 | Lee et al. | 348/349 |
| 2002/0114015 | A1 | * | 8/2002 | Fujii et al. | 358/302 |

FOREIGN PATENT DOCUMENTS

| JP | 8265620 | 10/1996 |
| JP | H08(1996)-265620 | 10/1996 |

* cited by examiner

*Primary Examiner* — David L Ometz
*Assistant Examiner* — Carramah J Quiett
(74) *Attorney, Agent, or Firm* — Rossi, Kimms & McDowell LLP (57) ABSTRACT

A focus detection apparatus is disclosed which enables accurate AF operations without a focusing judgment performed in an out-of-focus state even when taking an image including a high-luminance object. The focus detection apparatus generates luminance information of each pixel by using an output from a plurality of pixels of a photoelectric converting element which photoelectrically converts an object image formed by an optical system, and enumerates the number of at least one of pixels whose luminance information is higher than a predetermined luminance and pixels whose luminance information is lower than a predetermined luminance. And, information according to the enumerated result is outputted as the focusing information. The predetermined luminance is set based on the luminance information.

10 Claims, 7 Drawing Sheets

FOCUS DETECTION APPARATUS AND FOCUSING CONTROL APPARATUS UTILIZING PHOTOELECTRIC CONVERTING ELEMENT OUTPUT

BACKGROUND OF THE INVENTION

1. Field of the Invention

The present invention relates to a technique for performing, in an optical apparatus such as a video camera, a digital camera, a television camera, or an interchangeable lens, focus detection or focusing control by utilizing an output from a photoelectric converting element.

2. Description of the Related Art

In recent years, many image-taking apparatuses such as consumer video cameras have been mounted with auto-focusing (hereinafter, referred to as AF) apparatuses. The conventional AF apparatus extracts a signal corresponding to the sharpness (contrast) of an object image from an image-pickup signal and evaluates the signal to perform a focusing operation with an optical system has become the mainstream.

Figure 7:
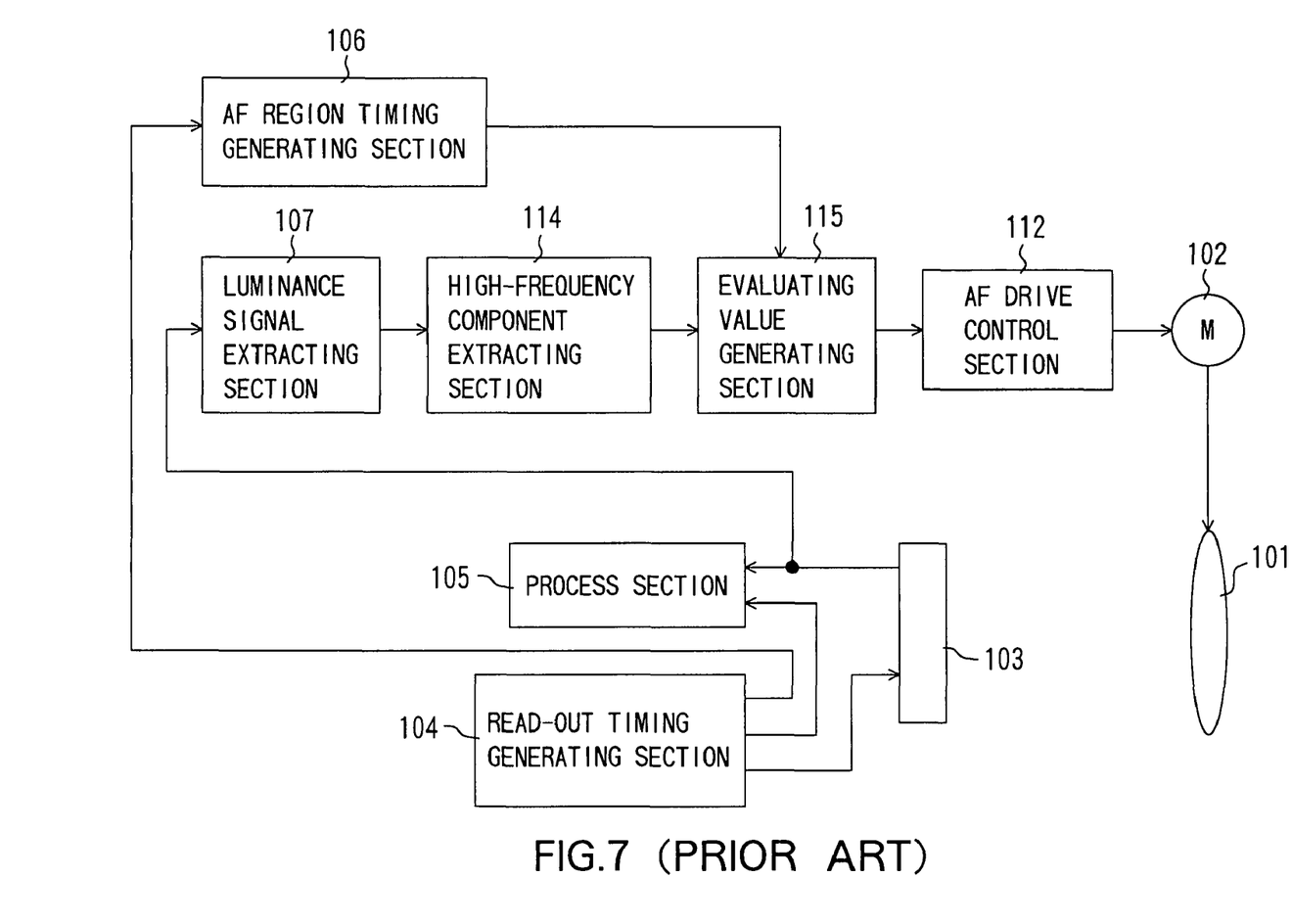
FIG. 7 is a block diagram showing a configuration of a conventional focusing apparatus.

A configuration example to realize this type of AF method will be described by use of FIG. 7. In the same drawing, Reference Numeral 101 denotes a focus lens contained in an image-taking optical system, and Reference Numeral 102 denotes an actuator for driving the focus lens 101. Reference Numeral 103 denotes a CCD, and Reference Numeral 104 denotes a read-out timing generating section which generates timing of reading out pixel information from the CCD 103.

Reference Numeral 105 denotes a process section to process output signals from the CCD 103 and prepare the output signal into a format for NTSC signals (or PAL signals) or the like, and Reference Numeral 106 denotes an AF region timing generating section which generates a signal to designate a pixel region (hereinafter, referred to as an AF evaluating region) read out to evaluate a focus state of an image-taking optical system by use of horizontal and vertical synchronizing signals from the read-out timing generating section 104.

Reference Numeral 107 denotes a luminance signal extracting section which extracts a luminance component from an output signal which is output from the CCD 103, and Reference Numeral 114 denotes a high-frequency component extracting section which receives a luminance signal from the luminance signal extracting section 107 and extracts, in terms of luminance components, a high-frequency component by use of a bandpass filter or the like.

Reference Numeral 115 denotes an evaluating value generating section which generates, in terms of output signals within an AF evaluating region determined by a signal from the AF region timing generating section 106, an evaluating value used for a focusing judgment such as a maximum output value or an added value of maximum values of the high-frequency component extracting section 114 in field cycle units. Reference Numeral 112 denotes an AF drive control section which controls the actuator 102 according to a result of the evaluating value generating section 115.

Next, operations of the above-described configuration will be described. An object image formed by a light flux passed through the focus lens 101 is projected on an image-pickup surface of the CCD 103, and is photoelectrically converted by the CCD 103. An output from the CCD 103 is read out by a read-out timing signal of a read-out timing generating section 104 and is inputted into the process section 105. In the process section 105, input signals are processed into an image format for NTSC signals or the like, and these image signals are outputted to a recording unit or an output terminal.

On the other hand, output signals of the CCD 103 are also transmitted to the luminance signal extracting section 107. In the luminance signal extracting section 107, a luminance signal component is generated from the inputted signals and is outputted to the high-frequency component extracting section 114. In the high-frequency component extracting section 114, a horizontal high-frequency component is extracted by a bandpass filter or the like. The extracted high-frequency component information is, in the evaluating value generating section 115, processed into an evaluating value required for AF operations in field cycle units.

In general, an evaluating value whose value increases as an edge component of the image is enhanced is generated, such as a maximum value of signals within an AF evaluating region designated by a signal from the AF region timing generating section 106, a sum of maximum values of respective horizontal lines within the AF evaluating region or the like.

In terms of the evaluating value generated as such, a comparison judgment is made in the AF drive control section 112 in field cycle units. And, in order to maximize the evaluating value, the focus lens 101 is driven via the actuator 102.

Here, as an image-taking apparatus to perform such AF control, a focusing apparatus proposed in Japanese Patent Application Laid-Open No. H8(1996)-265620 exists.

Figure 2:
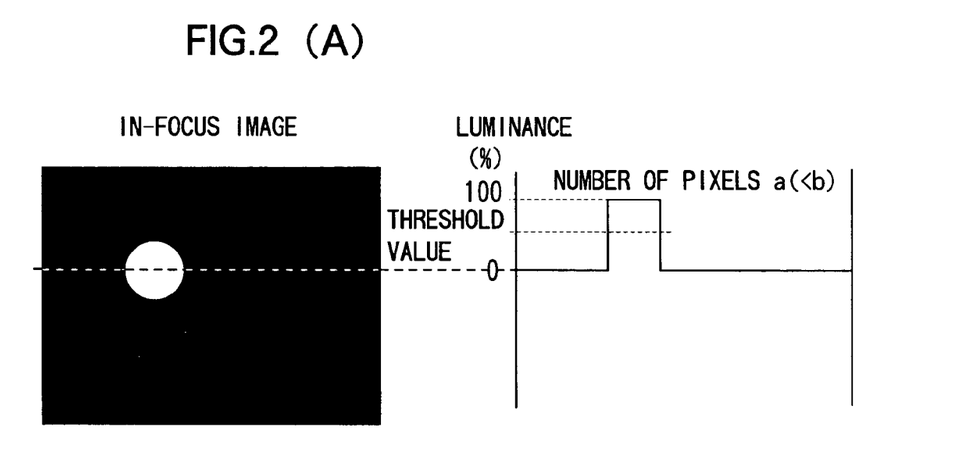
FIG. 2(A) is a schematic view showing an image within an AF evaluating region in an in-focus state and an enumerated value of high-luminance pixels.
FIG. 2(B) is a schematic view showing an image within an AF evaluating region in an out-of-focus state and an enumerated value of high-luminance pixels.

According to the above-described a conventional focusing apparatus, since a focusing judgment is made based on a high-frequency component of an image signal, namely, an edge component information, for example, with an attempt of taking an image of an object including a high-luminance light source (shown as a white outline region in the drawing) as shown in the left drawing of FIG. 2(A), a point where the edge component maximizes appears in a defocus state where no entity exists, and a focusing judgment is made in the defocusing state as in the left drawing of FIG. 2(B).

SUMMARY OF THE INVENTION

It is an object of the present invention to enable accurate AF operations without a focusing judgment made in an out-of-focus state even when taking an image including a high-luminance object.

The present invention provides, as one aspect to achieve the above-described object, a focus detection apparatus/method which generates, by using an output from a plurality of pixels of a photoelectric converting element which photoelectrically converts an object image formed by an optical system, focusing information representing a focus state of the optical system. According to the focus detection apparatus and method, luminance information of each of the plurality of pixels is generated by using the output, and the number of at least one of pixels whose luminance information is higher than a predetermined luminance or a predetermined luminance range and pixels whose luminance information is lower than the predetermined luminance or the predetermined luminance range is enumerated. Moreover, information according to the enumerated result is outputted as the focusing information. Furthermore, the predetermined luminance or the predetermined luminance range is set based on the luminance information.

In addition, as another aspect of the present invention, a focusing control apparatus/method generates, by using an output from a plurality of pixels of a photoelectric converting element which photoelectrically converts an object image formed by an optical system, focusing information representing a focus state of the optical system and controls the optical system based on the focusing information. In generation of the focusing information, luminance information of each of the plurality of pixels is generated from the pixel output, and the number of at least one of pixels whose luminance information is higher than a predetermined luminance or a predetermined luminance range and pixels whose luminance information is lower than the predetermined luminance or the predetermined luminance range is enumerated. Moreover, information according to the enumerated result is outputted as the focusing information. Furthermore, according to the focusing control apparatus and method, the predetermined luminance or the predetermined luminance range is set based on the luminance information.

Features of a focus detection apparatus (method) and a focusing control apparatus (method) of the present invention will become clearer from the following detailed description of the embodiments with reference to the accompanying drawings.

DETAILED DESCRIPTION OF THE PREFERRED EMBODIMENTS

Embodiment 1

Figure 1:
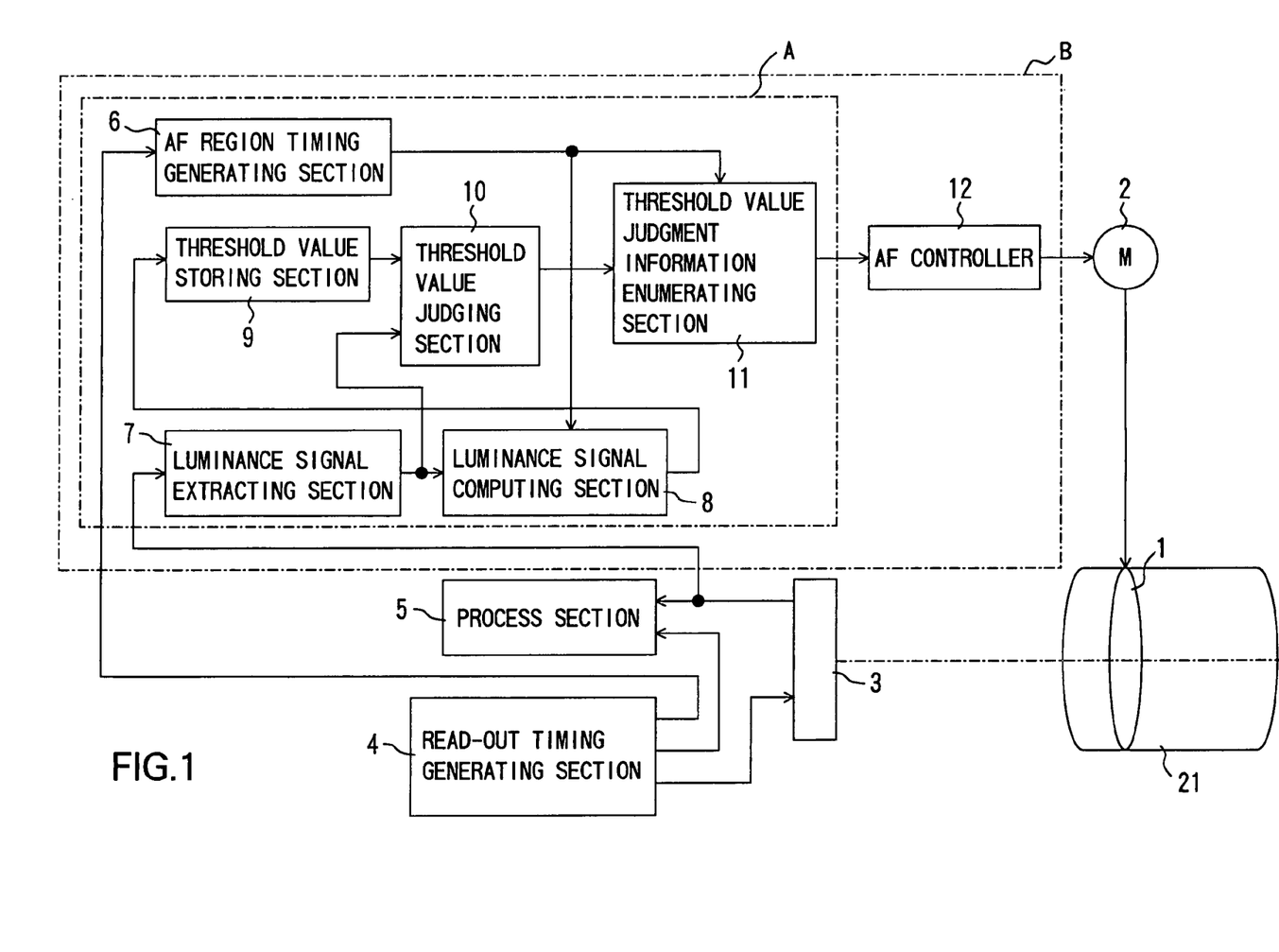
FIG. 1 is a block diagram showing a configuration of a focus detection apparatus and a focusing control apparatus, which is Embodiment 1 of the present invention.

FIG. 1 shows a configuration of a focus detection apparatus and a focusing control apparatus including the same, which is Embodiment 1 of the present invention. Here, in the FIG. 1, a part enclosed by the inner chain line is a focus detection apparatus A, and a part enclosed by the outer chain line is a focusing control apparatus B.

In the same drawing, Reference Numeral 21 denotes an image-taking optical system mounted on an optical apparatus such as an image-taking apparatus or an interchangeable lens apparatus, and Reference Numeral 1 denotes a focus lens contained in this image-taking optical system 21. Reference Numeral 2 denotes an actuator for driving the focus lens 1. Reference Numeral 3 denotes an image-pickup device composed of a CCD sensor, C-MOS sensor or the like, provided as a photoelectric converting element.

In the focus detection apparatus A, Reference Numeral 4 denotes a read-out timing generating section, which generates timing of reading out output signals (pixel signals) from respective pixels of the image-pickup device 3.

Reference Numeral 5 denotes a process section, which processes pixel signals from the CCD 3 to prepare the same into an image format for NTSC signals, PAL signals or the like.

Reference Numeral 6 denotes an AF region timing generating section, which generates a signal to designate a pixel region (an AF evaluating region) used to evaluate a focus state of an image-taking optical system 21 out of the image-pickup device 3 by using horizontal and vertical synchronizing signals from the read-out timing generating section 4. Reference Numeral 7 denotes a luminance signal extracting section provided as an information generating section, which extracts a luminance signal component of each pixel from pixel signals from the image-pickup device 3. Reference Numeral 8 denotes a luminance signal computing section provided as a setting section, which performs computing by using luminance signals which extracted in the luminance signal extracting section 7, based on pixel signals within an AF evaluating region which is determined by a signal from the AF region timing generating section 6.

Reference Numeral 9 denotes a threshold value storing section, which stores a computed value as a result of the luminance signal computing section 8 as a threshold value (a predetermined luminance) in one-field or one-frame period units. Reference Numeral 10 denotes a threshold value judging section, which judges, while employing a computed value stored in the threshold value storing section 9 as a threshold value, as to whether the luminance signal is high or low for each pixel of an output from the luminance signal extracting section 7 in comparison with this threshold value.

Reference Numeral 11 denotes a threshold value judgment information enumerating section provided as an information setting section, which enumerates the number of pixels judged to be luminance signals higher than the threshold value by the threshold value judging section 10. The threshold value judgment information enumerating section 11 outputs a result of this enumeration as a focusing information which represents a focus state of the image-taking optical system 21.

In the focusing control apparatus B, Reference Numeral 12 denotes an AF controller which controls drive of the actuator 2 according to a result (focusing information) of the threshold value judgment information enumerating section 11.

Next, operations of the above-described focusing control apparatus B will be described. A light flux from an object passed through the image-taking optical system 21 (focus lens 1) is projected on an image-pickup surface of the image-pickup device 3, and is photoelectrically converted by the image-pickup device 3. Pixel signals photoelectrically converted by the image-pickup device 3 are read out based on a read-out timing signal of the read-out timing control section 4 by the process section 5 and are also inputted into the luminance signal extracting section 7.

In the process section 5, input pixel signals are processed into an image format for NTSC signals, PAL signals or the like, and this is outputted to an unillustrated recording unit (which records image signals on various types of recording media) or an output terminal.

In the luminance signal extracting section 7, luminance signal components are extracted each of the plurality of pixel signals (namely, each of the plurality of pixels) from pixel signals, which are an output of the image-pickup device 3, and are outputted into the luminance signal computing section 8 and the threshold value judging section 10. In the luminance signal computing section 8, in terms of the inside of an AF evaluating region given by a signal from the AF region timing generating section 6, predetermined values of each field image such as a maximum value, a minimum value and an intermediate value of luminance signals inputted in the luminance signal extracting section 7, thereof are searched for or are determined by computing, and these are given to the threshold value storing section 9.

Here, in the present embodiment, a maximum value and a minimum value are searched for, and a mean value thereof is computed and outputted as an intermediate value to the threshold value judging section 10, via the threshold value storing section 9.

At the left side of FIG. 2(A), an example of an image within an AF evaluating region in an in-focus state is shown, and at the left side of FIG. 2(B), an example of an image within an AF evaluating region in an out-of-focus state (herein, in a defocusing-stop condition where drive of the focus lens 1 is stopped while remaining in an out-of-focus state) is shown. These two images are images different in focusing positions (focus states), by taking images of a high-luminance light source (shown as a white outline region in the drawing) such as a streetlight. In a case of these two images, the maximum value is white (luminance 100%), and the minimum value is black (luminance 0%), the intermediate value (mean value) becomes, for both, a gray level (luminance 50%).

In the threshold value storing section 9, the computed intermediate value of the given luminance signals is maintained until a luminance signal computed value of the next field is given, and the intermediate value is outputted as a threshold value to the threshold value judging section 10.

The threshold value judging section 10 judges, in comparison with a given threshold value, as to whether the luminance signal is high or low for each of the plurality of pixels within an AF evaluating region inputted from the luminance signal extracting section 7, and a result thereof is outputted to the threshold value judgment information enumerating section 11.

And, in the threshold value judgment information enumerating section 11, based on the inputted judgment result, the number of luminance signals higher than the threshold value (that is, the number of pixels where the higher-luminance signals have been obtained), which exist within an AF evaluating region given by a signal from the AF region timing generating section 6, is enumerated in one-field cycle units. The drawings at the right side of FIGS. 2(A) and 2(B) schematically show, with regard to pixels on a predetermined horizontal line within an AF evaluating region, a relationship between the luminance of each pixel and number of pixels having a luminance not less than the threshold value, and in the out-of-focus state of FIG. 2(B), the enumerated value of high-luminance pixels is b, and in the in-focus state of FIG. 2(A), the enumerated value of high-luminance pixels is a, which is less than b. For example, by carrying out such enumeration of high-luminance pixels for respective horizontal lines within an AF evaluating region, and by adding enumerated values of the respective horizontal lines, a total enumerated value of the high-luminance pixels within the AF evaluating region can be obtained.

In the examples of FIGS. 2(A) and 2(B), since the threshold value is on a gray level (luminance 50%), the number of pixels of the white (luminance 100%) part is enumerated. The enumerated value results in a value corresponding to the area of the high-luminance region (white part) within the AF evaluating region.

Herein, in this threshold value judgment, a threshold value determined based on a previous-field luminance signal and a luminance signal obtained in the current field are to be compared. Nevertheless, in general, since it is considered that correlation in the luminance between adjacent fields is high in taken-images, no instability in the enumerated values occurs.

The AF controller 12 compares an enumerated value (focusing information) sequentially (in field cycles) outputted from the threshold value judgment information enumerating section 11, and drives the focus lens 1 via the actuator 2 so that the enumerated value becomes a minimum value. Concretely, the AF controller 12 drives the focus lens 1 in a predetermined direction, and if an enumerated value at this time is smaller than the enumerated value before driving, this is considered as approximating the in-focus and the focus lens 1 is driven in the same direction the next time as well, and if an enumerated value is greater than the enumerated value before driving, this is considered as being distant from in-focus and the focus lens 1 is driven in the reverse direction the next time. Thus, a focus lens 1 position where the enumerated value becomes a minimum value is finally searched for, and focusing is achieved at a point in time where the minimum value is obtained.

According to the examples of FIGS. 2(A) and 2(B), the enumerated value by the threshold value judgment information enumerating section 11 results in a small value in the in-focus state of FIG. 2(A) rather than in the out-of-focus state of FIG. 2(B). In addition, since this magnitude relationship in the enumerated values, namely, a tendency to reduce the enumerated value in the focusing direction and to increase the enumerated value in the defocusing direction is maintained from a nearly in-focus state to in-focus, as well, an in-focus state can be accurately obtained according to the present embodiment.

In the present embodiment, a description has been given for a case where, in the threshold value judgment information enumerating section 11 and AF controller 12, the number of pixels having a luminance not less than the threshold value is enumerated, and the focus lens 1 is driven so as to minimize the enumerated value. However, the number of pixels having a luminance not more than the threshold value (equivalent to the black parts in the examples of FIGS. 2(A) and 2(B)) may be enumerated, and the focus lens 1 may be driven so that the enumerated value is maximized. In addition, by enumerating both the number of pixels with a luminance higher than the threshold value and the number of pixels with a luminance lower than the threshold value, and by carrying out a final focusing judgment through a comparison of these results of enumeration, it is also possible to further improve the focusing accuracy.

In addition, the threshold value set in the luminance signal computing section 8 may be a minimum value or maximum value of inputted luminance signals (for example, when a luminance brighter than the black level or darker than the white level is the minimum value or maximum value) or may be a value obtained by multiplying a minimum value or maximum value with a predetermined coefficient (for example, maximum value×coefficient 0.5). As such, the threshold value may be any as long as the value is dependent on inputted luminance signals.

Furthermore, in the present embodiment, although a description has been given for a case where the threshold value is set as one value, the threshold value may be set as a range and a number of pixels with a luminance higher or lower than the threshold value range may be enumerated.

According to the present embodiment as described above, a defocusing stop phenomenon of a high-luminance object is restrained, and accurate focusing control can be carried out.

Figure 6:
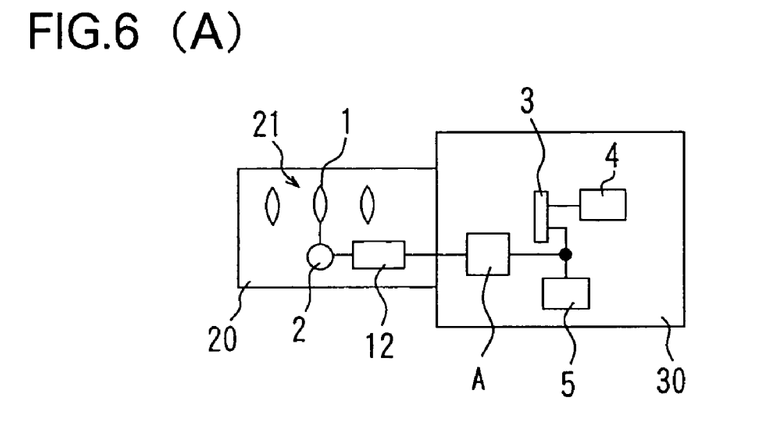
FIG. 6 are views showing mounting examples of the focus detection apparatuses and focusing control apparatuses of the above-described respective embodiments on image-taking systems.

Modes to actually mount the above-described focus detection apparatus and focusing control apparatus on an image-taking apparatus or a lens apparatus includes those as shown in FIGS. 6(A) to 6(C) (the same applies to the following embodiment).

FIGS. 6(A) to 6(C) show image-taking systems each composed of an interchangeable lens apparatus 20 and a camera 30 which the lens apparatus 20 can be attached and detached.

In any lens apparatus 20, an image-taking optical system 21 including a focus lens 1 and an actuator 2 to drive the focus lens 1 are provided. In addition, in any camera 30, an image-pickup device 3, a read-out timing generating section 4, and a process section 5 are provided.

And, in the camera 30 of FIG. 6(A), mounted is a focus detection apparatus A composed of elements with Reference Numerals 6-11 in FIG. 1 is mounted, and in the lens apparatus 20, an AF controller 12 which operates based on information of an enumeration result of high-luminance pixels transmitted from the focus detection apparatus A within the camera 30.

In addition, in the camera 30 of FIG. 6(B), mounted is a focusing control apparatus B composed of a focus detection apparatus A and an AF controller 12 which operates based on information of an enumeration result of high-luminance pixels transmitted from the focus detection apparatus A and transmits a drive signal to the actuator 2 within the lens apparatus 20.

In addition, the lens apparatus 20 of FIG. 6(C) receives, a pixel signal which is outputted from the image-pickup device 3 (or this may be a formatted image signal generated in the process section 5.) from the camera 30. This lens apparatus 20 has mounted a focusing control apparatus B composed of a focus detection apparatus A and an AF controller 12 which operates based on information of an enumeration result of high-luminance pixels.

Here, in FIGS. 6(A) to 6(C), although a description has been given of an image-taking system with a lens of interchangeable type, the present invention can also be applied to a camera integrated with a lens.

Embodiment 2

Figure 3:
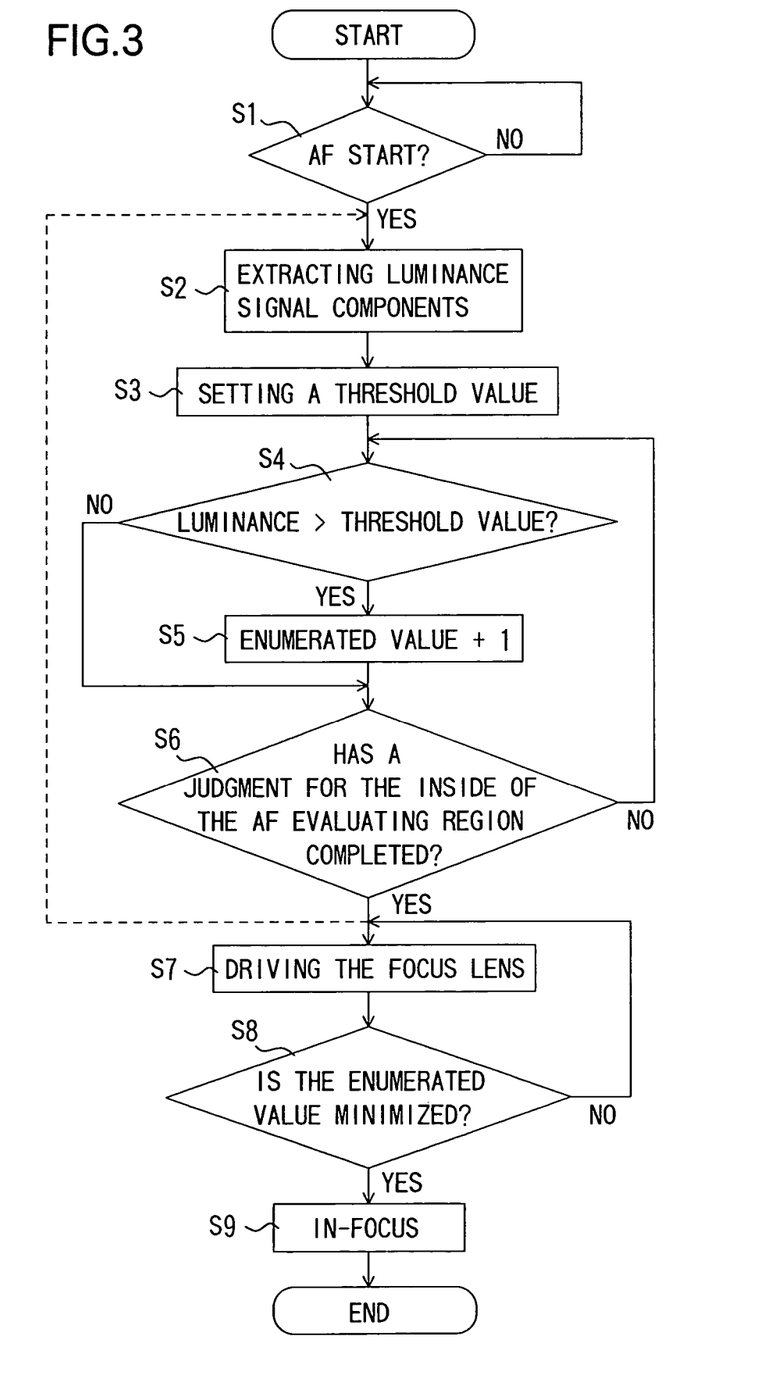
FIG. 3 is a flowchart showing operations of a focus detection apparatus and a focusing control apparatus, which is Embodiment 2 of the present invention.

In FIG. 3, as Embodiment 2 of the present invention, shown is a flowchart in a case where the focus detection and focusing control operations described in Embodiment 1 are carried out by a computer such as a CPU by using software (computer program). Here, in the present embodiment, reference numerals identical to the reference numerals of Embodiment 1 are used for components identical to those of Embodiment 1.

This flow starts when the power source of a camera or lens apparatus is turned on. First, in step (marked as S in the drawing) 1, a first stroke operation of a release switch for preparation of video-image taking or still-image taking by a camera is performed to judge as to whether or not to start AF.

If AF is to be started, the process proceeds to step 2 (equivalent to an information generating section), luminance signals are extracted from pixel signals which are output signals from respective pixels within an AF evaluating region on the image-pickup device 3. Here, a description concerning designation of an AF evaluating region will be omitted.

Then, in step 3 (equivalent to a setting section), the extracted luminance signals from the respective pixels are searched for their maximum value and minimum value, and a mean value of these is set as a threshold value. As described in Embodiment 1, this threshold value can be set at any value(s) as long as it is dependent on the luminance signals.

Next, in step 4 (in the following, steps up to step 6 are equivalent to an information outputting section), a luminance signal and the threshold value are compared pixel by pixel, and whether or not the luminance signal has a luminance higher than the threshold value is judged. If the luminance signal has a luminance higher than the threshold value, the process proceeds to step 5, the enumerated value (initial value 0) is incremented by 1, and the process proceeds to step 6. In step 4, if the luminance signal has a luminance not more than the threshold value, the process directly proceeds to step 6.

In step 6, whether or not a judgment in step 4 has completed is judged for luminance signals of all pixels within the AF evaluating region, and if it has not yet completed, the process returns to step 4. On the other hand, if a judgment in step 4 has completed for luminance signals of all pixels, the process proceeds to step 7. Here, steps 2 to 6 are repeated in every field cycle (shown by a dotted line in FIG. 3).

In step 7, the enumerated value integrated in step 5 is compared in every field cycle, and the focus lens 1 is driven via the actuator 2 until the enumerated value becomes a minimum value. And, when the enumerated value is minimized in step 8, in-focus is judged in step 9.

Embodiment 3

Figure 4:
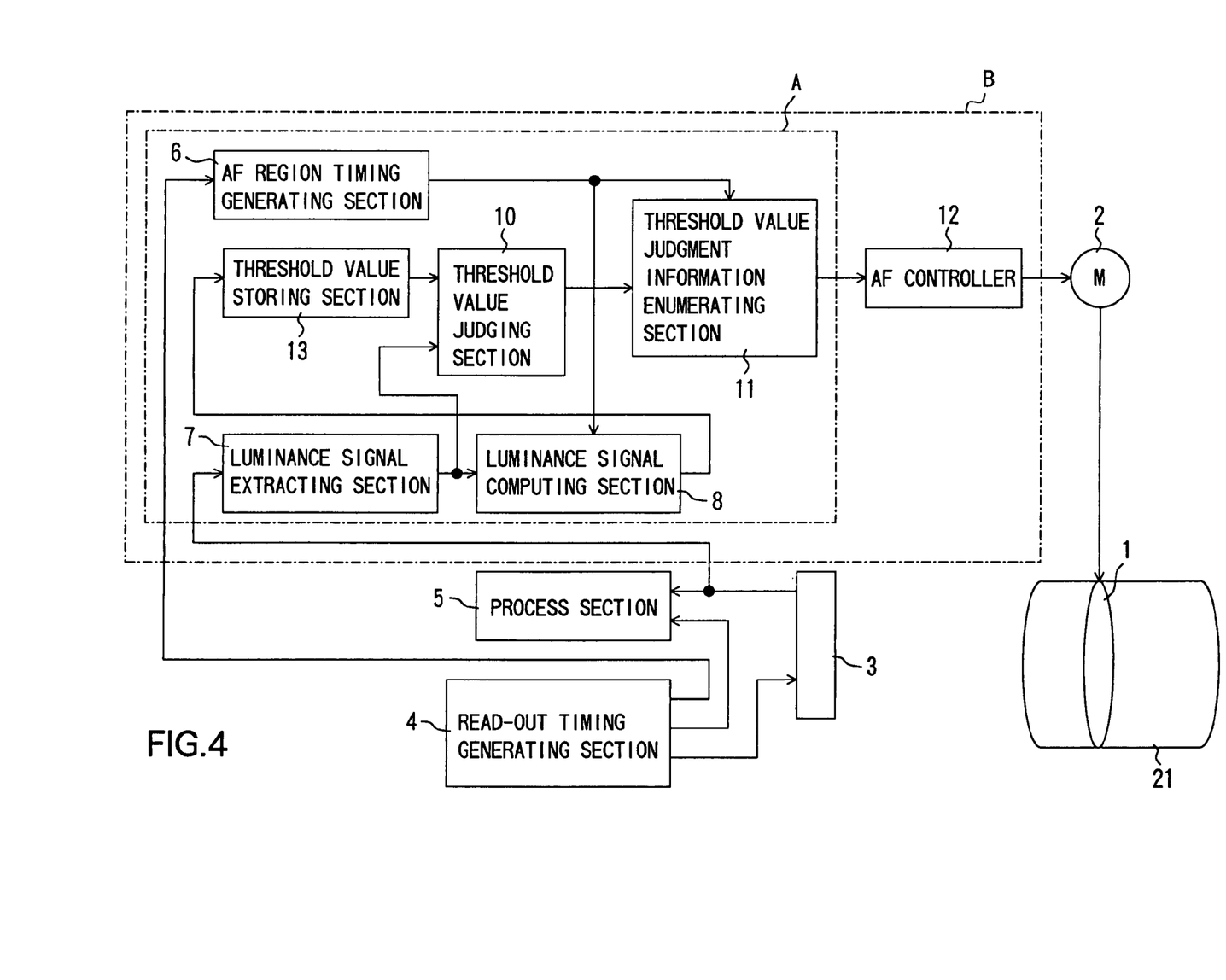
FIG. 4 is a block diagram showing a configuration of a focus detection apparatus and a focusing control apparatus, which is Embodiment 3 of the present invention.

FIG. 4 shows a configuration of a focus detection apparatus and a focusing control apparatus in Embodiment 3 of the present invention.

Here, in FIG. 4, reference numerals identical to those of Embodiment 1 are used for components in common with Embodiment 1, and description is thereby omitted.

The present embodiment is, in that the threshold value given to the threshold value judging section 10 is fixed over a period of a series of AF operations in a plurality of field cycles, different from Embodiment 1 where the threshold value is maintained only within one-field cycle.

In FIG. 4, Reference Numeral 13 denotes a threshold value setting section, which takes in a luminance signal computed value (threshold value) within an AF evaluating region designated by a signal given from the luminance signal computing section 8 at a timing of a trigger signal given from the AF controller 12 and stores the luminance signal computed value.

Figure 5:
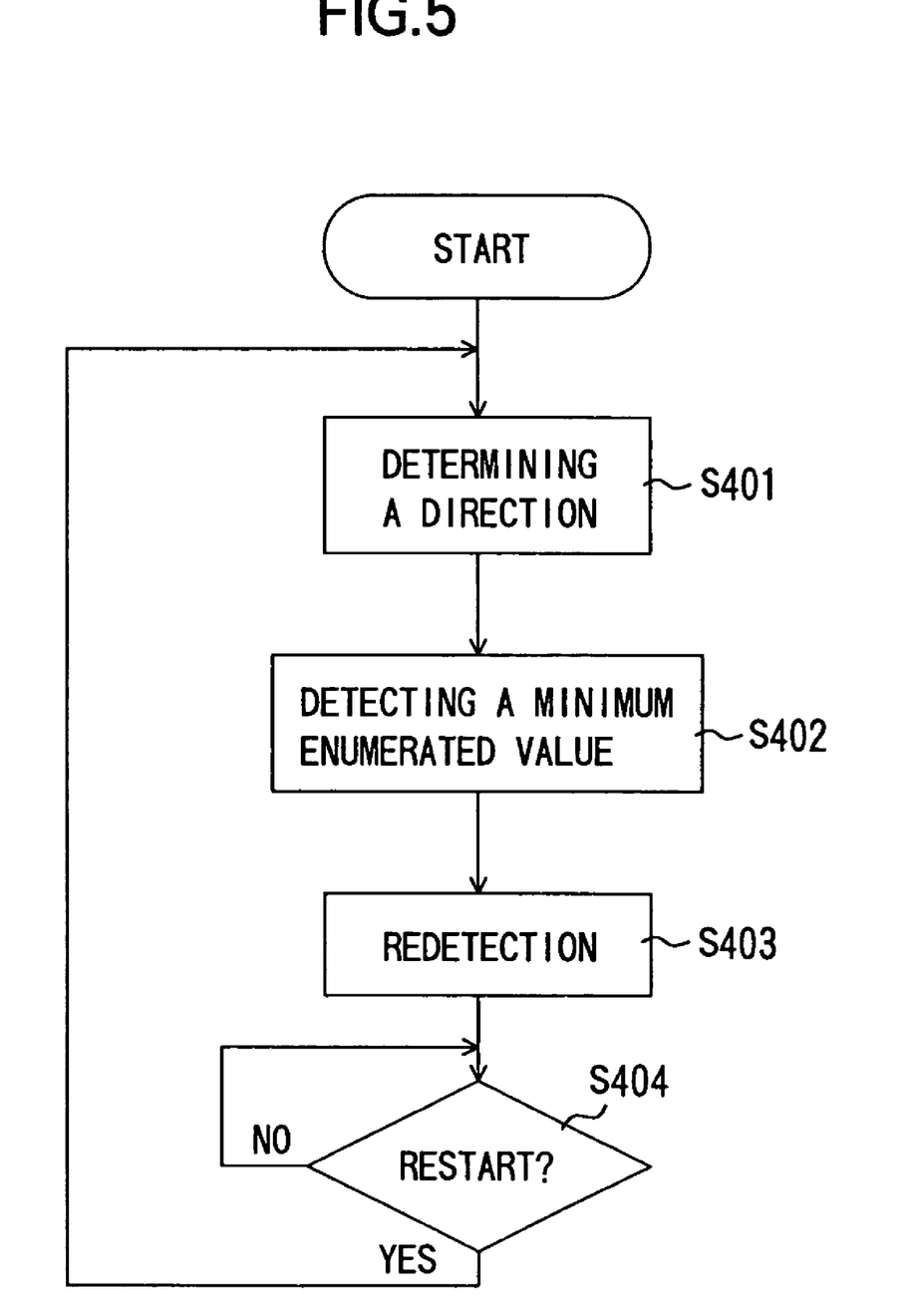
FIG. 5 is a flowchart showing focusing operations in the above-described Embodiment 3.

An AF operation flowchart in the present embodiment is shown in FIG. 5. This flowchart shows a process to compare, in the AF controller 12, in each field cycle, an enumerated value of pixels having a luminance higher than the threshold value, which has generated in the threshold value judgment information enumerating section 11 in the present embodiment, with an enumerated value of the previous field.

When the power is turned on, AF processes start. First, in step 401, the focus lens 1 is moved back and forth in the optical axis direction by a predetermined minute amount, whereby a direction where an enumerated value of high-luminance pixels after moving is reduced compared to an enumerated value before moving is judged.

Next, in step 402, the focus lens 1 is driven in units of a predetermined driving amount in the direction judged in step 401, whereby a focus position where the enumerated value is minimized is detected. Furthermore, in step 403, the focus lens 1 is driven in units of a driving amount smaller than the predetermined driving amount in step 402, whereby a focus position where a minimum enumerated value is obtained is detected more precisely than in step 402. By the operations in step 402 and step 403, accurate in-focus can be obtained speedily (in a short time) compared to a case where a focus position where a minimum enumerated value is obtained is detected from the first with accuracy. Here, step 401 to step 403 are a series of AF operations.

Thereafter, the process becomes a restart standby state in step 404. Herein, while sequentially confirming enumerated values, when an enumerated value is greatly changed (by a predetermined amount or more), the process returns to step 401 with a recognition that the taken-images (scene) has changed, and the AF operations are restarted. In other words, the above-described threshold value is newly set when a change in the enumerated values becomes greater than a predetermined amount in a state of completion of the focusing operations.

Here, when a change in the enumerated values becomes remarkably small (by a predetermined amount or less) in response to a movement of the focus lens 1 in steps 402 and 403, as well, the AF operations are restarted with a recognition that the taken-images has changed.

According to such a process flow, the operation from the AF restarting to in-focus are carried out in a condition where a correlation between the respective images of the fields is high. In the present embodiment, a threshold value is determined by utilizing this correlation. Namely, in the AF controller 12, at a timing of judgment of a driving direction of the focus lens 1 (step 401), a threshold value holding signal is outputted to the threshold value setting section 13, and at this time, a mean (intermediate) luminance signal within an AF evaluating region from the luminance signal computing section 8 is held and given to the threshold value judging section 10.

By employing such a configuration, since the threshold value is changed (newly set) when the correlation in taken-images is weakened, it becomes possible to stably perform AF operations even in a transition process with a change in the objects (when the scene is changed).

While preferred embodiments have been described, it is to be understood that modification and variation of the present invention may be made without departing from scope of the following claims.

What is claimed is:

1. A focus detection apparatus configured to generate, based on an output from a plurality of pixels of a photoelectric converting element which photoelectrically converts an object image formed by an optical system, focusing information representing a focus state of the optical system, the focus detection apparatus comprising:
    an information generating section configured to generate luminance information of each of the plurality of pixels based on the output from the plurality of pixels of the photoelectric converting element;
    a setting section configured to set a luminance value or a luminance range of values based on the luminance information of at least one of the plurality of pixels; and
    an information outputting section configured to receive the luminance information from the information generating section, configured to count a number of at least one of the plurality of pixels whose luminance information is higher or lower than the luminance value or the luminance range of values set by the setting section, and configured to output count information as the focusing information,
    wherein the setting section newly calculates and sets the luminance value or the luminance range of values when a change in the counted number is greater than a predetermined amount in a state of completion of a focusing operation by the optical system.

2. The focus detection apparatus according to claim 1, wherein the setting section is configured to set the luminance value or the luminance range of values based on at least one of maximum luminance information or minimum luminance information included in the luminance information.

3. The focus detection apparatus according to claim 1, wherein the luminance information of at least one of the plurality of pixels is a maximum, minimum, or average luminance information among the luminance information of the plurality of pixels.

4. A focusing control apparatus comprising:
    a focus detection unit configured to generate, based on an output from a plurality of pixels of a photoelectric converting element which photoelectrically converts an object image formed by an optical system, focusing information representing a focus state of the optical system; and
    a controller configured to control the optical system based on the focusing information,
    wherein the focus detection unit comprises:
    an information generating section configured to generate luminance information of each of the plurality of pixels based on the output from the plurality of pixels of the photoelectric converting element;
    a setting section configured to set a luminance value or a luminance range of values based on the luminance information of at least one of the plurality of pixels; and
    an information outputting section configured to receive the luminance information from the information generating section, configured to count a number of at least one of the plurality of pixels whose luminance information is higher or lower than the luminance value or the luminance range of values set by the setting section, and configured to output count information as the focusing information,
    wherein the setting section newly calculates and sets the luminance value or the luminance range of values when a change in the counted number is greater than a predetermined amount in a state of completion of a focusing operation by the optical system.

5. The focusing control apparatus according to claim 4, wherein the setting section is configured to set the luminance value or the luminance range of values based on at least one of maximum luminance information or minimum luminance information included in the luminance information.

6. The focusing control apparatus according to claim 4, wherein the controller controls the optical system so that the focusing information sequentially obtained in each predetermined period becomes one of a minimum value or a maximum value.

7. The focus control apparatus according to claim 4, wherein the luminance information of at least one of the plurality of pixels is a maximum, minimum, or average luminance information among the luminance information of the plurality of pixels.

8. An optical apparatus comprising:
    a photoelectric converting element having a plurality of pixels which photoelectrically convert an object image formed by an optical system; and
    a focus detection apparatus configured to generate, based on an output from the plurality of pixels of the photoelectric converting element, focusing information representing a focus state of the optical system,
    wherein the focus detection apparatus comprises:
    an information generating section configured to generate luminance information of each of the plurality of pixels based on the output from the plurality of pixels of the photoelectric converting element;
    a setting section configured to set a luminance value or a luminance range of values based on the luminance information of at least one of the plurality of pixels; and
    an information outputting section configured to receive the luminance information from the information generating section, configured to count a number of at least one of the plurality of pixels whose luminance information is higher or lower than the luminance value or the luminance range of values set by the setting section, and configured to output count information as the focusing information, wherein the setting section newly calculates and sets the luminance value or the luminance range of values when a change in the counted number is greater than a predetermined amount in a state of completion of a focusing operation by the optical system.

9. An optical apparatus comprising:

a photoelectric converting element having a plurality of pixels that photoelectrically convert an object image formed by an optical system; and a focusing control apparatus, wherein the focus control apparatus comprises:

a focus detection unit configured to generate, based on an output from the plurality of pixels of a photoelectric converting element, focusing information representing a focus state of the optical system; and a controller configured to control the optical system based on the focusing information, wherein the focus detection unit comprises:

an information generating section configured to generate luminance information of each of the plurality of pixels based on the output from the plurality of pixels of the photoelectric converting element;

a setting section configured to set a luminance value or a luminance range of values based on the luminance information of at least one of the plurality of pixels; and an information outputting section configured to receive the luminance information from the information generating section, configured to count a number of at least one of the plurality of pixels whose luminance information is higher or lower than the luminance value or the luminance range of values set by the setting section, and configured to output count information as the focusing information, wherein the setting section newly calculates and sets the luminance value or the luminance range of values when a change in the counted number is greater than a predetermined amount in a state of completion of a focusing operation by the optical system.

10. An optical apparatus comprising:

an optical system; and a focusing control apparatus, wherein the focus control apparatus comprises:

a focus detection unit configured to generate, based on an output from a plurality of pixels of a photoelectric converting element, focusing information representing a focus state of the optical system; and a controller configured to control the optical system based on the focusing information, wherein the focus detection unit comprises:

an information generating section configured to generate luminance information of each of the plurality of pixels based on the output from the plurality of pixels of the photoelectric converting element;

a setting section configured to set a luminance value or a luminance range of values based on the luminance information of at least one of the plurality of pixels; and an information outputting section configured to receive the luminance information from the information generating section, configured to count a number of at least one of the plurality of pixels whose luminance information is higher or lower than the luminance value or the luminance range of values set by the setting section, and configured to output count information as the focusing information, wherein the setting section newly calculates and sets the luminance value or the luminance range of values when a change in the counted number is greater than a predetermined amount in a state of completion of a focusing operation by the optical system.

* * * * *